United States Patent
Bohm et al.

(10) Patent No.: US 6,868,093 B1
(45) Date of Patent: Mar. 15, 2005

(54) METHODS AND APPARATUSES FOR PROVIDING SYNCHRONIZATION IN A COMMUNICATION NETWORK

(75) Inventors: Christer Bohm, Nacka (SE); Magnus Danielson, Stocksund (SE); Per Lindgren, Stockholm (SE)

(73) Assignee: Net Insight AB, Hagersten (SE)

( * ) Notice: Subject to any disclaimer, the term of this patent is extended or adjusted under 35 U.S.C. 154(b) by 0 days.

(21) Appl. No.: 09/700,479

(22) PCT Filed: May 12, 1999

(86) PCT No.: PCT/SE99/00810

§ 371 (c)(1),
(2), (4) Date: Nov. 14, 2000

(87) PCT Pub. No.: WO99/59297

PCT Pub. Date: Nov. 18, 1999

(30) Foreign Application Priority Data

May 14, 1998 (SE) .............................. 9801706

(51) Int. Cl.[7] .................................................. H04J 3/06
(52) U.S. Cl. ....................... 370/506; 370/508; 370/509; 370/510; 370/512; 370/514; 370/516; 375/357; 375/362; 375/371
(58) Field of Search ................................ 370/503, 506, 370/508, 509, 510, 512, 516, 519, 514, 442, 445; 375/357, 362, 365, 366, 368, 373, 376, 371

(56) References Cited

U.S. PATENT DOCUMENTS

| 5,661,763 | A | | 8/1997 | Sands ........................ 375/368 |
|---|---|---|---|---|
| 5,790,608 | A | * | 8/1998 | Benayoun et al. .......... 375/356 |
| 5,841,779 | A | * | 11/1998 | Kainulainen ................. 370/514 |
| 6,278,718 | B1 | * | 8/2001 | Eschholz ..................... 370/503 |
| 6,317,475 | B1 | * | 11/2001 | Kasurinen .................... 375/356 |

FOREIGN PATENT DOCUMENTS

EP    0 596 652 A1    5/1994

OTHER PUBLICATIONS

Bohm, C., et al., "The DTM Gigabit Network," *Journal of High Speed Networks*, vol. 3, 1994, pp. 109–126.

Lindgren, P., "A Multi–Channel Network Architecture Based on Fast Circuit Switching," PhD thesis, Royal Institute of Technology, Stockholm, Sweden, May 1996, pp. 104–109.

* cited by examiner

*Primary Examiner*—Steven Nguyen
*Assistant Examiner*—Roberta Stevens
(74) *Attorney, Agent, or Firm*—MacPherson Kwok Chen & Heid LLP

(57) ABSTRACT

The present invention refers to methods and apparatuses for providing synchronization in a time division multiplexed network, wherein data is transferred on multi-access bitstreams in circuit-switched channels that are defined by respective time slots of regularly recurrent frames of said bitstreams, said frames being defined by regularly recurrent frame synchronization signals transferred on said bitstreams. According to the invention an auxiliary regularly recurrent frame synchronization signal is generated and selected as a basis for defining said frames on a bitstream if the frame synchronization signal that is used as a basis for synchronizing said frames during normal operation is not detected in accordance with an expected frame rate.

26 Claims, 3 Drawing Sheets

METHODS AND APPARATUSES FOR PROVIDING SYNCHRONIZATION IN A COMMUNICATION NETWORK

FIELD OF INVENTION

The present invention refers to methods and apparatuses for providing synchronization in a time division multiplexed communication network, more specifically in networks wherein data are transferred in bitstreams that are divided into regularly recurrent frames of time slots.

Background and Prior Art

Today, new types of circuit-switched communication networks are being developed for the transfer of information using time division multiplexed, multi-access bitstreams, wherein each bitstream is divided into regularly recurrent frames, or cycles, each frame in turn being divided into time slots.

An example of such a new network technology is the DTM (Dynamic Synchronous Transfer Mode) network, which for example is described in "The DTM Gigabit Network", Christer Bohm, Per Lindgren, Lars Ramfelt, and Peter Sjödin, Journal of High Speed Networks, 3(2):109-126, 1994, and in "Multi-gigabit networking based on DTM", Lars Gauffin, Lars Håkansson, and Björn Pehrson, Computer networks and ISDN Systems, 24(2):119-139, April 1992.

For each multi-access bitstream in such a network, a so-called trigger or master node is arranged at an uppermost upstream location on the bitstream and is provided to transmit a regularly recurrent frame synchronization signal into one or more time slots of the bitstream. In this way, the master node establishes frame synchronization by defining frames on said bitstream for downstream provided nodes to synchronize operations to.

When forming a network comprising several such multi-access links or bitstreams, these may be interconnected using so-called switch nodes. In order to avoid problems such as loss of data (also known in the art as "slip") when transferring data from one such bitstream to another, the frame rate of the different network bitstreams need to be synchronized.

This is generally provided by a synchronization scheme that ensures the same (at least nominally) frame repetition frequency on all bitstreams of the network. Such a synchronization scheme may for example be a hierarchical synchronization structure of the kind described in EP 522607, using two types of synchronization nodes: so called synchronization master nodes and synchronization slave nodes. Each such synchronization master node and slave node controls at least one outgoing bitstream, which means that it is responsible for generating a frame-defining signal on the respective bitstream. However, whereas the master node synchronizes its transmission of frame synchronization signal according to its own clock, for example using an atomic clock connected to the master node, each synchronization slave node will transmit its frame synchronization signals in accordance with frame synchronization signals received from another node, i.e. the master node or another slave node. In this way, a frame synchronization signal is propagated from the master node via the slave nodes in a tree-like fashion through the network. The master node thus dictates the frame frequency of the network.

However, this scheme has a drawback when being implemented in a large network. When a link or node failure occurs that breaks the distribution tree, the links (and all the nodes having access thereto) at the leaf of the tree from the failure point do no longer receive the propagated frame synchronization signal, and network synchronization consequently stops is deteriorated in this leaf. Each synchronizing slave node on the leaf may then try to find a new frame synchronization signal from another path through the network, i.e. from another bitstream of the network. However, before the new path is established, the communication may stop functioning, which of course is a mayor disadvantage.

An object of the invention is to provide a solution that overcomes these problems.

SUMMARY OF THE INVENTION

The above mentioned and other objects are achieved by the invention as defined in the accompanying claims.

According to the invention, a node, which that is typically arranged downstream on a bitstream with respect to a frame defining head-end node (such as a master node), is arranged to monitor the reception of said frame synchronization signal on said bitstream and to coordinate its operations accordingly. Furthermore, if the node determines that frame synchronization signal has not been received as expected, for example that the frame synchronization signal is received too early or too late, is distorted, or is not received at all, the node will take over the frame rate defining role and provide a frame defining frame synchronization signal based upon a clock signal generated locally at the node.

According to one aspect of the invention, the latter operation of taking over the frame rate defining role is performed in relation to the same bitstream as the one upon which the original frame synchronization signal was supposed to be received, i.e. the bitstream normally controlled by said head-end node.

According to another aspect of the invention, the latter operation of taking over the frame rate defining role is performed in relation to another bitstream upon which the monitoring node acts as head-end.

Consequently, in case of link or node failure causing the frame synchronization signal to be lost, at least temporarily, the invention provides an advantageous means for a node to maintain frame synchronization on links or link sections arranged downstream with respect to the point of link or node failure.

The invention further provides advantageous means of determining whether or not the frame synchronization signal is received as expected.

According to one embodiment, this determination is achieved by defining a time interval, the location of which typically being based upon an expected frame rate, and by monitoring that said frame synchronization signal is received within said time interval. If not, this will trigger the node to take over the frame rate defining role and provide a frame synchronization signal based upon a clock generated locally at the node.

In a preferred embodiment, the expected frame rate is repeatedly adjusted according to the rate of previously receptions of said frame synchronization signal, for example using a phase locked loop, thereby accommodating for small and acceptable changes in the frame rate. However, in an alternative embodiment, the expected frame rate is a pre-defined rate.

The invention also provides an advantageous way of restoring network synchronization after said link failure has been taken care of and the link is once again up and running. Basically, according to the invention, when the original frame synchronization signal is once again detected, the operation of the node having temporarily taken on the role as frame synchronization defining node is re-synchronized to the original frame synchronization signal.

According to a preferred embodiment, said re-synchronization is achieved by increasing or decreasing the lenght of one or more frames generated by said node to adjust the phase difference between the locally generated frame synchronization signal and the original frame synchronization signal. For example, this is achieved by increasing or decreasing the number of slots of one or more frames defined by said locally generated frame synchronization signal or by decreasing or increasing a bit rate used when generating said locally generated frame synchronization signal.

Typically, fill slots that in, e.g., the above-mentioned DTM network are normally used between frames to absorb the differences in bit clocks on different links may according to an embodiment of the invention also be used for performing re-synchronization. For example, a master node will typically provide the same amount of fill slots at the end of each frame, whereas the slave node may adjust the number of fill slots between frames to maintain or adjust the desired phase difference between frames received and frames transmitted by the slave node.

The invention thus provides advantageous means for ensuring that links or link sections that do not get any frame synchronization signal maintain the frame synchronization (allowing a small drift) and for re-synchronizing such links or link sections to the network frame rate when the original frame synchronization signal is recovered.

Furthermore, the invention is advantageously used in DTM networks. In DTM, the requirements on network synchronization are such that an input and an output bitstream may be arbitrarily located in phase with respect to each other as long as there is no persistant phase drift between the two. Furthermore, frame synchronization is provided in a tree-like, top-down manner. In DTM, the time slots of each frame are furthermore divided into into two groups, control slots and data slots, and wherein each node typically has access to at least one control slot and a number of data slots within each frame, said number of data slots being dynamically adjustable based upon the bandwidth requested by the end users being served by the respective node. The frame synchronization signal is then typically transmitted as such a time slot to mark the start of each frame.

These and other aspects, advantages and features of the invention will be more fully understood from the following description of embodiments thereof as well as from the accompanying claims.

Brief Description of the Drawings

Exemplifying embodiments of the invention will now be described with reference to the accompanying drawings, wherein.

DETAILED DESCRIPTION OF PREFERRED EMBODIMENTS

Figure 1:
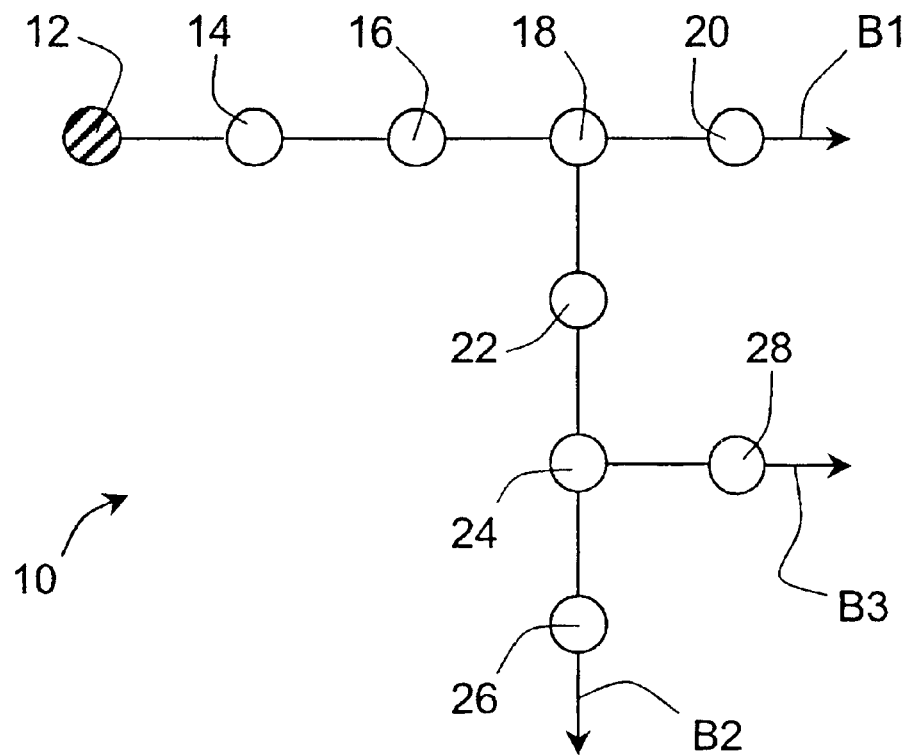
FIG. 1 schematically shows a section of a time division multiplexed network operating according to an embodiement the invention.

A network 10 operating according to an embodiment of the invention will now be describe with reference to FIG. 1. The network section shown in FIG. 1 includes three bitstreams B1, B2, and B3 propagating in the directions indicated by arrows in the figure and transferring data between nodes 12–28 of the network. An example of the structure of each one of the bitstreams in FIG. 1 will be described below with reference to FIG. 2. In the network section of FIG. 1, nodes 12, 14, 16, 18, and 20 are connected to bitstream B1, nodes 18, 22, 24, and 26 are connected to bitstream B2, and nodes 24 and 28 are connected to bitstream B3. Each node typically provides end users connected to the respective node with access to the network bitstreams. In order to communicate with other nodes, a node will transmit data into, or read data from, allocated time slots of the bitstream concerned. If a node on a first bitstream, for example node 14 on bitstream B1, wishes to transmit data to a node on another bitstream, for example node 28 on bitstream B3, so-called switch nodes will be used to transfer said data from one bitstream to another, i.e. node 18 will transfer said data from slots of bitstream B1 to slots of bitstream B2 and node 24 will transfer said data from slots of bitstream B2 to slots of bitstream B3.

Figure 2:
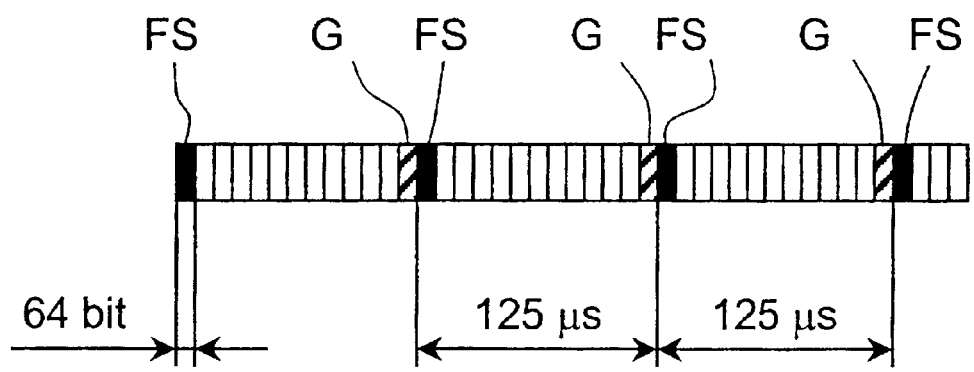
FIG. 2 schematically shows the structure of a bitstream of the kind forming part of the network shown in FIG. 1.

For each one of the bitstreams, a head-end node 12, 18, and 24, respectively, thereof is connected to define frame synchronization on the respective bitstream by transmitting a regularly recurrent frame synchronization signal (referred to below as frame start signal) and a corresponding guard pattern indicating the start and end, respectively, of a frame, as will be further below with reference to FIG. 2. Node 12, which is assumed to be the synchronization master node of the network, establishes a principal frame rate by transmitting a frame start signal on bitstream B1. Node 18, which acts as a synchronization slave node, will transmit a frame start signal on bitstream B2 in synchronization with the frame start signal received, as provided by the master node 12, on bitstream B1. Similarly, node 24, which is also a synchronization slave node, will transmit a frame start signal on bitstream B3 in synchronization with the frame start signal received, as provided by the slave node 18, on bitstream B2, the slave node 18 thus acting as head-end node on bitstream B2, and so on.

The structure of a bitstream of the kind transferred within the network 10 in FIG. 1 will now be described with reference to FIG. 2. As shown in FIG. 2, each bitstream is divided into regularly recurrent cycles or frames having an essentially fixed length, for example 125 μs. Each frame is in turn divided into fixed size, e.g. 64-bit, time slots. The number of time slots within a frame depends on the network's bit rate.

The start of each frame is defined by one or more frame synchronization slots FS transferring the frame start signal that is used to synchronize the operation of each node in relation to each frame. Also, to make sure that the number of slots in one frame will not overlap a following frame, a guard pattern G, comprising on or more "fill" slots, is added after the last payload data slot at the end of each frame.

To be noted, in a DTM network, the remaining time slots are in general divided into two groups, control slots and data slots. The control slots are used for control signaling between nodes of the network, i.e. for carrying messages between nodes for the internal operation of the network, such as for channel establishment, slot allocation, and the like. The data slots are used for the transfer of user data (payload data) between end users connected to said nodes.

Each node will typically have access to at least one control slot and to a dynamic number of data slots within each frame of on the bitstream that is accessed by said node. Each node uses its control slot to communicate with other nodes within the network. Furthermore, the number of data slots allocated to each node may for example depend upon the transfer capacity requested by the end users served by the respective node. If the end users of a certain node require a large transfer capacity, the node will allocate more data slots for that purpose. On the other hand, if the end users of a certain node merely require a small transfer capacity, the node may limit its number of allocated data slots. The allocation of control slots and data slots to different nodes may by dynamically adjusted as the network load changes.

Figure 3A:
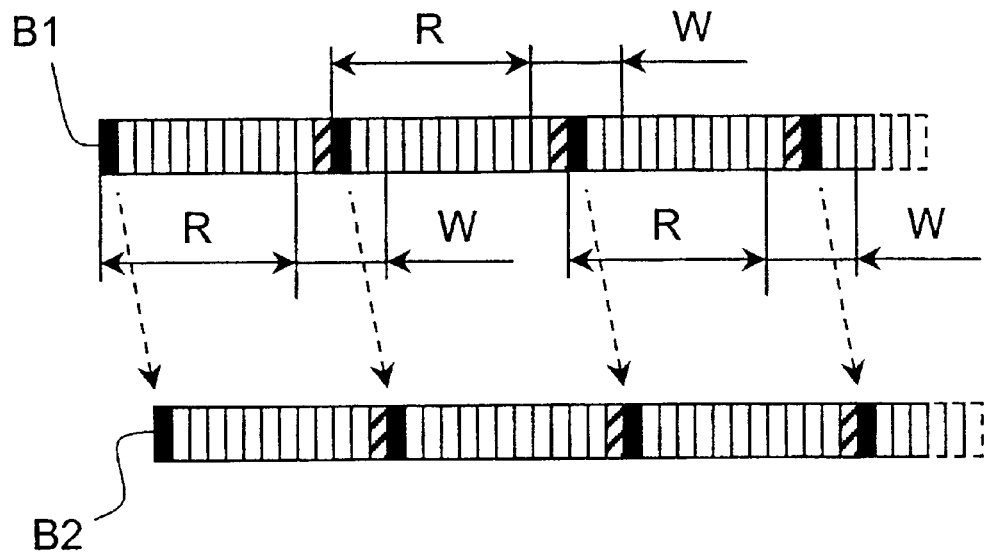
FIGS. 3a and 3b schematically illustrate synchronization operations in relation to two bitstreams according to an embodiment of the invention.
Figure 3B:
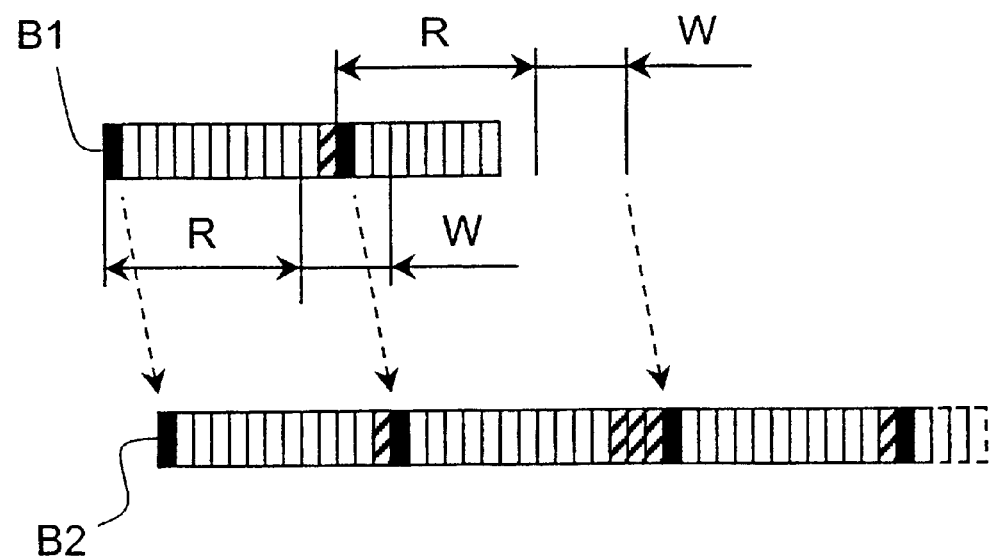

With reference once again to FIG. 1, in order to prevent network synchronization break-down on a leaf section of the network as a result of node or link failure, the synchronization slave nodes 18 and 24 are provided to continuously monitor the reception of the incoming frame start signal on bitstreams B1 and B2, respectively, and to transmit a frame start signal to bitstream B2 and B3, respectively, according to a frame rate generated locally at the respective slave node in case the incoming frame start signal is not received as expected, e.g. within a specific time interval, as will be further described with reference to FIGS. 3a and 3b.

If, for example, the master node 12 is subjected to malfunction, or the link carrying bitstream B1 fails at a position located upstream with respect to the slave node 18, the slave node 18 will detect that the frame start signal on bitstream B1 is no longer received as expected and will, as a result, decide to continue transmitting the frame start signal into bitstream B2 at a frame rate generated locally at node 18. Thus, frame synchronization on bitstreams B2 and B3 will be unaffected by said malfunction or failure. When normal operation of the master node, or the link carrying bitstream B1, is restored, the slave node 18 will detect the re-established frame start signal on bitstream B1, and will then re-synchronize the transmission of the frame start signal into bitstream B2 according to the restored frame rate on the bitstream B1, as will be further described with reference to FIG. 4.

In order to further prevent network synchronization break-down on a leaf section of the network tree as a result of node or link failure, a node connected to a bitstream and receiving a frame start signal may be provided to continuously monitor the reception of said frame start signal and to take over the role as synchronization establishing node on that same bitstream in case the incoming frame start signal is not received as expected, for example within a specific time interval.

If, for example, node 18 is subjected to malfunction, node 22 may be arranged to detect that no frame start signal is received on bitstream B2 as expected and to decide, as a result thereof, to take on the role as frame defining node on bitstream B2 by transmitting a frame start signal on bitstream B2 at a frame rate generated locally at node 22. Thus, synchronization of communication on bitstreams B2 and B3 downstream with respect to node 22 will be unaffected by said malfunction. When normal operation of node 18 is restored, node 22 will detect the re-established frame start signal on bitstream B2 and will then re-synchronize its transmissions of frame start signals on bitstream B1 accordingly.

Figure 4:
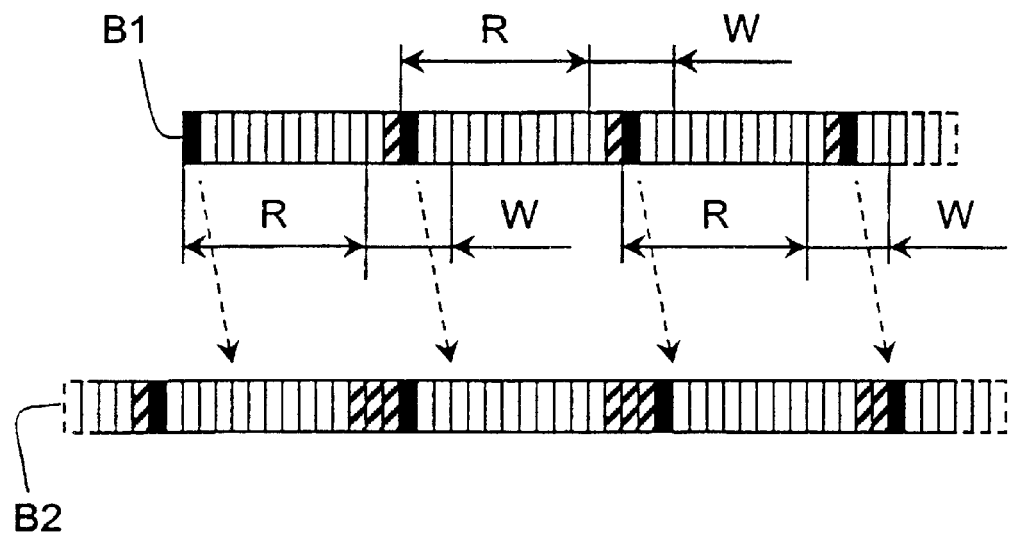
FIG. 4 schematically illustrates frame re-synchronization operations according to an embodiment of the invention.

A preferred embodiment of synchronization operations with respect to a first and a second bitstream according to an embodiment of the invention will now be described with reference to FIGS. 3a and 3b, wherein a node, which for example may be node 18 in FIG. 1, is arranged to monitor receptions of an incoming frames start signal (indicated as black-filled time slots) on bitstream B1 and to transmit a frame start signal on bitstream B2 according to the reception of the frame start signal on bitstream B1, as indicated by dashed arrows in FIGS. 3a, 3b, and 4). As is understood, there will be a frame phase difference between the two bitstreams due to the processing delay through the node.

Having detected a frame start signal for a present frame, for example the first frame shown in FIG. 3a, the node will define a time interval or window having a size W and being located at a distance R in time from the latest reception of the frame start signal, as indicated in FIG. 3a. As long as the next frame start signal on bitstream B1 is received within said time window, the node will continue transmitting frame start signals on bitstream B2 accordingly. If there is a small difference in the frame length of the two bitstreams, i.e. a difference accommodated by the size of the time interval, the node may increase or decrease the frame length of the frame on bitstream B2 by adding or removing guard band time slots (as indicated by patterned time slots in FIGS. 3a, 3b, and 4) to the frame on the bitstream B2.

However, if the node does not detect any frame start signal on bitstream B1 within the time window, for example as a result of a link failure, the node will decide to transmit a frame start signal on bitstream B2 without having received any incoming frame start signal (as schematically illustrated by the dashed arrow at the right hand limit of the time window to the right in FIG. 3b), and will continue transmitting such a frame start signal on bitstream B2 at a frame rate generated locally at the node until a frame start signal is once again detected on bitstream B1. The operation will then be re-synchronized to the incoming frame start signal on bitstream B1, for example as described below with reference to FIG. 4.

A preferred embodiment of a frame re-synchronization operation according to the invention will now be described with reference to FIG. 4. To the left in FIG. 4, it is assumed that the node discussed above with reference to FIGS. 3a and 3b has taken over control of the frame rate on bitstream B2 due to a malfunction or the like of the incoming bitstream B1, for example as described above with reference to FIG. 3b. When the incoming bitstream B1 and the frame start signal thereupon is once again detected by the node, it is arranged to re-synchronize the frame rate and phase on bitstream B2 to the re-established frame start signal on the bitstream B1. Since a phase difference has occurred between the two bitstreams B1 and B2 (in addition to the natural phase difference caused by the processing delay of the node, as represented by the inclination of the arrows in FIG. 4) due to the temporary malfunction, the node will gradually adjust this phase difference by adding, as is shown in FIG. 4, or removing guard pattern time slots to/from the frames on bitstream B2 until the phase difference between the two bitstreams is the desired one. In FIG. 4, this is achieved by the addition of extra guard band time slots in three frames of bitstream B2. Having restored frame synchronization in this manner, the operation returns to the normal operating mode that is described above with reference to FIG. 3a.

As is understood, the decision as to whether or not to take over control of the frame rate (based upon said time window) and the subsequent re-synchronization as described with reference to FIGS. 3a, 3b, and 4, may also be performed by a node in order to maintain frame synchronization on one and the same bitstream, for example as discussed in relation to the node 22 with reference to FIG. 1. The same goes for the operation the node to be described below with reference to FIG. 5. In such a situation, the illustrated bitstream B1 will be the bitstream as received at the node, and the illustrated bitstream B2 will be the same bitstream as transmitted from the node. Hence, the structure and operation of such an embodiment will become clear for a person skilled in the art and further detailed description thereof is therefore omitted herein.

Figure 5:
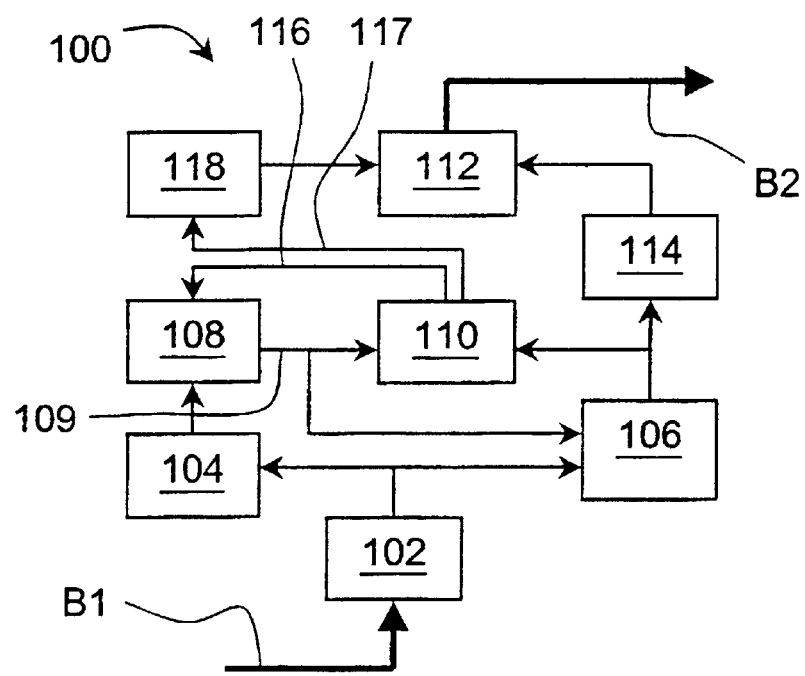
FIG. 5 schematically shows a block diagram of a node according to an embodiment of the invention.

En exemplifying embodiment of a node performing the operations discussed above will now be described with reference to FIG. 5. In FIG. 5, the node 100 is connected to a first bitstream B1 and a second bitstream B2, which for example could be bitstreams B1 and B2 in FIGS. 1, 3a, 3b, and 4, and comprises a first access unit 102, a bit clock retrieving circuit 104, an input demultiplexor 106, an input time slot counter 108, a frame start control circuit 110, an output time slot counter 118, a switching circuit 114, and a second access unit 112.

In the node 100, time slot data, such as a frame start signal, control data for network signaling, user payload data, guard band fill slots, and the like, is received from bitstream B1 via the first access unit 102 and is supplied to the bit clock retrieving circuit 104 and to the input demultiplexor 106. The bit clock retrieving circuit 102 locks a bit clock of the node to the clock rate received on bitstream B1, so that at least the input port components of the node will operate at a clock frequency corresponding to the one received on bitstream B1. The bit clock retrieving circuit 104 provides the derived input bit frequency to, among others, the time slot counter 108. Based upon the input big frequency derived by the bit clock retrieving circuit 104, the time slot counter 108 will output time slot counts (each time slot comprising, e.g., 64 bits of data), typically starting from zero to essentially the frame length.

The output time slot clock signal 109 from the time slot counter is provided to, among others, the input demultiplexor 106 and the frame start control circuit 110. Based upon the clock signal 109, the input demultiplexor 106 will demultiplex the input bitstream bits into 64-bit time slots of data, which are sequentially provided to the frame start control circuit 110 and to the switching circuit 114 at the rate of the clock signal.

The frame start control circuit 110 will search for the frame start signal among the 64-bit time slots provided from the demultiplexor 106. If a frame start signal, i.e. a frame start time slot, is detected within a time interval that is defined by a first and a second count as provided by the counter 108, the frame start control circuit 110 will reset the input time slot counter 108 as well as an output time slot counter 118 using reset signals 116 and 117, respectively, thereby indicating the start of a new frame, and continue searching for the next frame start time slot.

However, if no frame start signal is detected within said time interval, the frame start control unit 110 will reset the output time slot counter 118 at the end of the time interval, thus providing for the output of a new frame of time slot data by the second access unit 112 to bitstream B2 even if no input frame start signal has been received.

If the bit clock retrieving circuit 104 does not receive any input clock frequency from bitstream B1, it will maintain the last determined bit clock frequency until a bit clock is once again established on the bitstream B1. As is understood, in this example, the bit clock locking circuit 104 provides a phase locking function at a bit clock level, whereas the frame start control circuit 110 and the time slot counter 108 together form a phase locking circuit at frame rate level.

When the frame start signal is once again detected by the frame start control unit 110, it will reset the input time slot counter 108 and start anew looking for a next detection of the frame start signal. However, since the frame rate of the frame start control circuit 110 and the counter 108, when no frame start signal is established on bitstream B1, is likely to start to slowly drift in accordance with the common network frame clock, and since it is no telling when the frame start signal will once again be detected from bitstream B1, there will likely be a phase difference between the input frame and the output frame when the frame start signal on bitstream B1 is restored. This phase difference will be recognized by the frame start control unit 110 which will then gradually adjust an offset of the provision of the reset signal to the output counter 118 as compared to the provision of the reset signal to the input counter 108, so that the frame length of the output bitstream B2 is temporarily either increase or decreased as compared to the frame length of the input bitstream B1, of course not exceeding the available or appropriate number of fill slots for each frame, until the phase difference is the desired one.

As understood, the node 100 in FIG. 5 is typically arranged to switch data according to currently established channels. However, with the exemption of the schematically illustrated switching circuit 114, dedicated means for performing and controlling the actual switching of data in space and time are not shown in FIG. 5, while the invention does not refer thereto.

Although exemplifying embodiments of the invention have been described in detail above with reference to the accompanying drawings, the invention is of course not limited thereto. Consequently, as is understood by those skilled in the art, modifications, alterations, and combinations thereof will fall within scope of the invention, as defined by the accompanying claims.

What is claimed is:

1. A method for providing synchronization in a time division multiplexed communication network, wherein:

a regularly recurrent frame of a first multi-access bitstream, which is accessed by two or more nodes of said network, is defined by a first regularly recurrent frame synchronization signal that is transferred on said first bitstream;

a regularly recurrent frame of a second multi-access bitstream, which is accessed by two or more nodes of said network, is defined by a second regularly recurrent frame synchronization signal that is transferred on said second bitstream; and a node of said network is provided to transmit said second frame synchronization signal into said second bitstream based upon detection of said first frame synchronization signal on said first bitstream, said node performing the step of:

transmitting said second frame synchronization signal into said second bitstream based upon an auxiliary regularly recurrent frame synchronization signal generated at said node if said first frame synchronization signal is not received on said first bitstream by said node in accordance with an expected frame rate.

2. A method as claimed in claim 1, wherein said transmitting step comprises transmitting said second frame synchronization signal into said second bitstream based upon said auxiliary regularly recurrent frame synchronization signal if said first frame synchronization signal is not received within a time interval that is defined with respect to the time of the latest reception of said first frame synchronization signal.

3. A method as claimed in claim 1, wherein said expected frame rate is a predefined frame rate.

4. A method as claimed in claim 1, wherein said expected frame rate is repeatedly adjusted according to the frame rate of previously receptions of said first frame synchronization signal.

5. A method as claimed in claim 1, comprising the step of re-synchronizing the transmission of said second frame synchronization signal to receptions of said first frame synchronization signal when it is once again received on said first bitstream.

6. A method as claimed in claim 5, wherein said re-synchronizing step comprises temporarily increasing or decreasing the frame length on said second bitstream to adjust the phase difference between the auxiliary frame synchronization signal and said first frame synchronization signal.

7. A method as claimed in claim 6, wherein said step of temporarily increasing or decreasing the frame length on said second bitstream comprises increasing or decreasing the number of slots of one or more frames on said second bitstream.

8. A method as claimed in claim 1, wherein said regularly recurrent frame synchronization signal is transferred in one or more time slots of the respective bitstream.

9. A method as claimed in claim 1, wherein data is transferred on said bitstreams in circuit-switched channels defined by one or more respective time slots within each frame of the respective bitstream.

10. A method for providing synchronization in a time division multiplexed communication network, wherein:

a regularly recurrent frame of a multi-access bitstream of said network is defined by a regularly recurrent frame synchronization signal that is transferred on said bitstream;

a node of said network, having access to said bitstream, is provided to detect said frame synchronization signal on said bitstream and to operate in relation to said bitstream based thereupon, said node performing the step of:

transmitting a regularly recurrent auxiliary frame synchronization signal generated at said node into said bitstream to define frames thereon if the first-mentioned frame synchronization signal is not detected on said bitstream in accordance with an expected frame rate.

11. A method as claimed in claim 10, wherein said transmitting step comprises transmitting said auxiliary frame synchronization signal into said bitstream if the first-mentioned frame synchronization signal is not received on said bitstream within a time interval that is defined with respect to the time of the latest reception of the first-mentioned frame synchronization signal on said bitstream.

12. A method as claimed in claim 11, wherein the position in time of said time interval with respect to the time of the latest reception of said first-mentioned frame synchronization signal is based upon said expected frame rate.

13. A method as claimed in claim 10, wherein said expected frame rate is a predefined frame rate.

14. A method as claimed in claim 10, wherein said expected frame rate is repeatedly adjusted according to the frame rate of previously receptions of the first-mentioned frame synchronization signal.

15. A method as claimed in claim 10, comprising the step re-synchronizing the operation at said node in accordance with the first-mentioned frame synchronization signal when it is once again received by said node on said bitstream.

16. A method as claimed in claim 15, wherein said re-synchronizing comprises re-synchronizing the transmission of said auxiliary frame synchronization signal to the first-mentioned frame synchronization signal when it is once again detected on said first bitstream.

17. A method as claimed in claim 15, wherein said step of re-synchronizing comprises temporarily increasing or decreasing the frame length on said bitstream to adjust the phase difference between said auxiliary frame synchronization signal and the first-mentioned frame synchronization signal.

18. A method as claimed in claim 17, wherein said step of temporarily increasing or decreasing the frame length on said bitstream comprises increasing or decreasing the number of slots of one or more frames on said bitstream.

19. An apparatus for providing synchronization in a time division multiplexed communication network, wherein regularly recurrent frames of a first and second multi-access bitstream are defined by a first and second, respectively, regularly recurrent frame synchronization signal transferred on the respective bitstream, said apparatus comprising:

means for detecting said first frame synchronization signal on said first bitstream and for transmitting said second frame synchronization signal into said second bitstream based thereupon; and means for selecting an auxiliary regularly recurrent frame synchronization signal generated by said apparatus as a basis for transmission of said second frame synchronization signal into said second bitstream if said first frame synchronization signal is not detected on said first bitstream in accordance with an expected frame rate.

20. An apparatus as claimed in claim 19, wherein said selecting means comprises:

means for defining a time interval with respect to the timing of the latest reception of said first frame synchronization signal based upon said expected frame rate; and means for determining whether or not a next reception of said first frame synchronization signal occurs within said time interval and, if not, to select said auxiliary frame synchronization signal as the basis for the transmission of said second frame synchronization signal.

21. An apparatus as claimed in claim 20, wherein said defining means comprises a counter which is reset at each reception of said first frame synchronization signal, one or both limits of said time interval being defined by one or both corresponding counts of said counter.

22. An apparatus as claimed in claim 20, wherein said defining means comprises a phase locked loop which is locked to the rate of said first frame synchronization signal and thus provides said expected frame rate.

23. An apparatus for providing synchronization in a time division multiplexed communication network, said apparatus comprising:

means for accessing a multi-access bitstream, wherein regularly recurrent frames is defined on said bitstream by a regularly recurrent frame synchronization signal that is transferred on said bitstream;

means for detecting said frame synchronization signal on said first bitstream;

means for generating an auxiliary regularly recurrent frame synchronization signal to be transmitted to define said regularly recurrent frame on said bitstream if the first-mentioned frame synchronization signal is not detected in accordance with an expected frame rate.

24. An apparatus as claimed in claim 23, wherein said generating means comprises:
- means for defining a time interval with respect to the time of a latest reception of said first-mentioned frame synchronization signal based upon said expected frame rate; and
- means for detecting whether or not a next reception of said first-mentioned frame synchronization signal is detected within said time interval and, if not, to select said auxiliary frame synchronization signal as the basis for defining said regularly recurrent frames on said bitstream.

25. An apparatus as claimed in claim 24, wherein said defining means comprises a counter which is reset at each reception of said first-mentioned frame synchronization signal, one or more limits of said time interval being defined by one or more corresponding counts reached by said counter.

26. An apparatus as claimed in claim 24, wherein said defining means comprises a phase locked loop which is locked to the rate of said first-mentioned frame synchronization signal and thus provides said expected frame rate.

* * * * *